(No Model.)

S. BARTLETT.
SAW SET.

No. 261,900. Patented Aug. 1, 1882.

Witnesses.
S. N. Piper
E. B. Pratt

Inventor.
Sylvanus Bartlett.
by R. H. Eddy atty.

UNITED STATES PATENT OFFICE.

SYLVANUS BARTLETT, OF KEENE, NEW HAMPSHIRE.

SAW-SET.

SPECIFICATION forming part of Letters Patent No. 261,900, dated August 1, 1882.

Application filed February 11, 1882. (No model.)

*To all whom it may concern:*

Be it known that I, SYLVANUS BARTLETT, of Keene, of the county of Cheshire, of the State of New Hampshire, have invented a new and useful Improvement in Saw-Sets; and I do hereby declare the same to be described in the following specification and represented in the accompanying drawings, of which—

Figure 1:
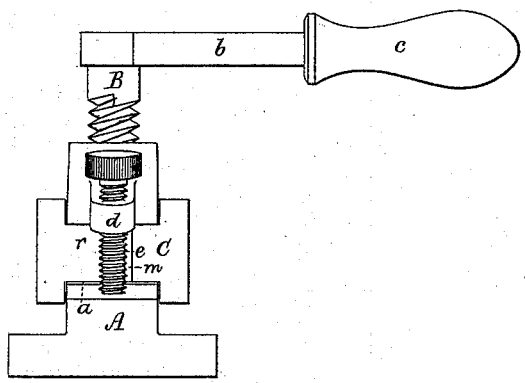
Figure 2:
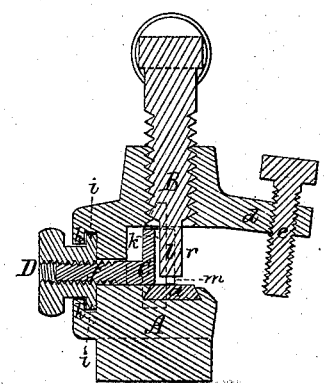
Figure 3:
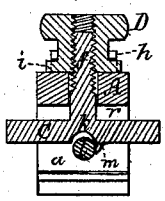

Figure 1 is a side elevation, Fig. 2 a vertical and transverse section, and Fig. 3 a horizontal section, of a saw-set embodying my invention, the nature of which is duly set forth in the claim hereinafter presented.

The saw-set is a screw-press with sundry additions, as hereinafter explained.

The body of the said press is shown at A as provided with a bed, $a$, and over such bed a setting-screw, B, from whose upper part there is extended an arm, $b$, terminating in a handle, $c$. This setting-screw is shown as "two-threaded"—that is, having two threads—and as screwed into the press-body A, from which there is extended, as shown, an arm, $d$, carrying another screw, $e$, screwed into and through the said arm, all being as represented.

Directly above the bed $a$ the body of the press is recessed, as shown at $r$, to receive a saw-blade, and also a movable gage, C, provided with a male screw, $f$, which projects rearward from the gage at its middle, and goes through the press-body and engages with a screw-nut, D. This nut is held to the said body by the screw and by two hooked lips, $h$, that project from the body, as shown, and clasp a flange, $i$, formed at the base of the nut. On revolving the nut one way the gage will be moved toward the setting-screw. So, by turning the nut in the reverse direction the gage will be drawn backward from the setting-screw. In the middle of the front face of the gage is a vertical recess, $k$, to receive the lower portion, $l$, of the setting-screw. Alongside of such recess the gage is provided with a tooth-stop, $m$, that extends from the bed upward and projects from the gage in manner, and is formed in transverse section, as represented. This tooth-stop forms a ready means of adjusting the teeth of a saw successively to the setting-screw. To accomplish such adjustment the saw, preparatory to each tooth being set, has to be moved so as to bring the stop between such tooth and the next one in rear of it, and so that the latter shall bear against the stop, and the teeth at their points be against the gage. The saw-blade is to rest on the bed and against the lower end of the screw $e$. On revolving the setting-screw in the proper direction it will be forced down upon the saw-teeth and will set it or bend it down to the bed. The recess in the gage allows of its being advanced farther by its adjusting screw and nut than it could be were it without the recess.

From the above it will be seen that the tooth-stop of the adjustable gage is permanently fixed to or in one piece with such gage, and therefore will always maintain its position, and not be liable to be moved out of place under the action of the screw while the latter may be setting down a tooth of a saw; furthermore, that, besides the adjustable gage and the tooth-stop in one piece, as described, and the screw-press, I have in my saw-set the arm $d$ and its screw $e$, whereby the saw is held from rising while a tooth may be in the act of being set by the action of the screw. The screw $e$ also operates to steady the saw and prevent it from being moved aside under tendency of the setting-screw B while descending upon and bending down such tooth, to move such tooth laterally or out of place on the bed, as the tooth, in case of being so moved, will not be properly set. A punch would not so operate on the saw-tooth.

It will also be seen that the adjusting-screw of the movable gage is permanently fixed to it, and extends backward from it into a nut held in place by hooked lips and by the body of the press; also, that the screw in no respect projects through the gage and against a setting-punch or the setting-screw in order to keep the gage from falling forward out of place, as is the case in the saw-set described in the United States Patent No. 101,932. So, by reason of the tooth-stop of the adjustable gage being permanently fixed to the latter and arranged vertically therein, as shown, it cannot be forced back or out of place by a saw, and has no holder projecting from the gage and to interfere with the inclining of the saw on the bed or the ready application of the saw to the stop.

What I claim in the above-described saw-set is as follows, viz:

The improved saw-set, substantially as described, consisting of the base or frame A, having screw-receiving orifices, the bed $a$, hooked lips $h$, and arm $d$, as described, the screws B and $e$, the flanged nut D, and the recessed adjustable gage C, with its tooth-stop $m$ and the screw $f$ in one piece with it, (the said gage,) all being arranged and to operate essentially as set forth.

SYLVANUS BARTLETT.

Witnesses:
 HIRAM BLAKE,
 GEORGE COLE.